United States Patent [19]
Covington et al.

[11] Patent Number: 5,257,751
[45] Date of Patent: Nov. 2, 1993

[54] FILM CASSETTE WITH REMOVABLE LIGHT TRAP

[75] Inventors: Roger G. Covington, Rochester; David B. Kemp, Fairport, both of N.Y.

[73] Assignee: Eastman Kodak Company, Rochester, N.Y.

[21] Appl. No.: 891,016

[22] Filed: Jun. 1, 1992

[51] Int. Cl.⁵ ............................................. G03B 17/26
[52] U.S. Cl. ................................... 242/71.1; 354/275
[58] Field of Search ........................... 242/71.1, 71.7; 354/275; 206/397, 407, 409

[56] References Cited

U.S. PATENT DOCUMENTS

| | | |
|---|---|---|
| 1,164,835 | 12/1915 | Mandel . |
| 1,459,914 | 6/1923 | Knorr . |
| 1,694,401 | 12/1928 | Slocum . |
| 2,484,248 | 10/1949 | Roehrl ................................. 242/71 |
| 3,104,846 | 9/1963 | Ringle ................................. 242/71.1 |
| 3,408,909 | 11/1968 | Kisselmann et al. . |
| 4,034,929 | 7/1977 | Ebner, Jr. ........................... 242/71.1 |
| 4,420,120 | 12/1983 | Raymond ........................... 242/71.7 |
| 5,083,720 | 1/1992 | Niedospial et al. ................ 242/71.1 |

FOREIGN PATENT DOCUMENTS 61-255340 11/1986 Japan .

*Primary Examiner*—John M. Jillions
*Attorney, Agent, or Firm*—Roger A. Fields

[57] ABSTRACT

In a film cassette, a cartridge shell has respective sections that are asssembled together to define an internal film chamber and a film passageway leading out of the chamber. A light-trapping material is located in the passageway to prevent ambient light from entering the chamber. According to the invention, at least one of the shell sections has a frame device hingedly connected to the one section for folding against the one section to secure the light-trapping material in place and for unfolding to release the light-trapping material to permit it to be removed.

4 Claims, 2 Drawing Sheets

FILM CASSETTE WITH REMOVABLE LIGHT TRAP

BACKGROUND OF THE INVENTION

1. Field of the Invention

The invention relates generally to the field of photography, and in particular to film cassettes.

2. Description of the Prior Art

A 35 mm film cassette has been proposed which, unlike conventional film cassettes, can be operated to automatically advance a film leader out of the cassette shell simply by rotating the film spool in the unwinding direction. The film leader originally is located entirely inside the cassette shell. Specifically, in commonly assigned U.S. Pat. No. 5,046,682, granted Sep. 10, 1991, there is disclosed a film cassette wherein a spool is supported for rotation in an unwinding direction inside a plastic shell, a filmstrip is coiled about the spool to form a film roll with an outermost convolution that is a non-protruding leader, a pair of flanges are coaxially arranged along the spool to radially confine the film roll to keep the roll captive, and a film stripper is located substantially adjacent a passageway out of the shell to be received between a leading end of the leader and a next-inward convolution of the film roll to divert the leading end into the passageway when the spool is rotated in the unwinding direction. Once the leading end is substantially advanced into the passageway, the transverse stiffness of the filmstrip serves to flex the flanges away from each other to permit the filmstrip to escape the confinement of the flanges.

A pair of black velvet or plush pads are affixed, such as by glueing, to respective walls of the passageway to prevent ambient light from reaching the film roll. The problem, however, is that glueing makes it difficult to separate the pads from the cassette shell when one attempts to recyle the plastic shell.

SUMMARY OF THE INVENTION

In a film cassette, a cartridge shell has respective sections that are asssembled together to define an internal film chamber and a film passageway leading out of the chamber. A light-trapping material is located in the passageway to prevent ambient light from entering the chamber. According to the invention, at least one of the shell sections has a frame device hingedly connected to the one section for folding against the one section to secure the light-trapping material in place and for unfolding to release the light-trapping material to permit it to be removed. This arrangement provides an easy way to separate the light-trapping material from the film cassette in order to recycle the cassette shell.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Commonly assigned John J. Niedospial U.S. Pat. No. 5,046,682, entitled FILM CASSETTE, and granted Sep. 10, 1991, is incorporated in this application.

Figure 1:
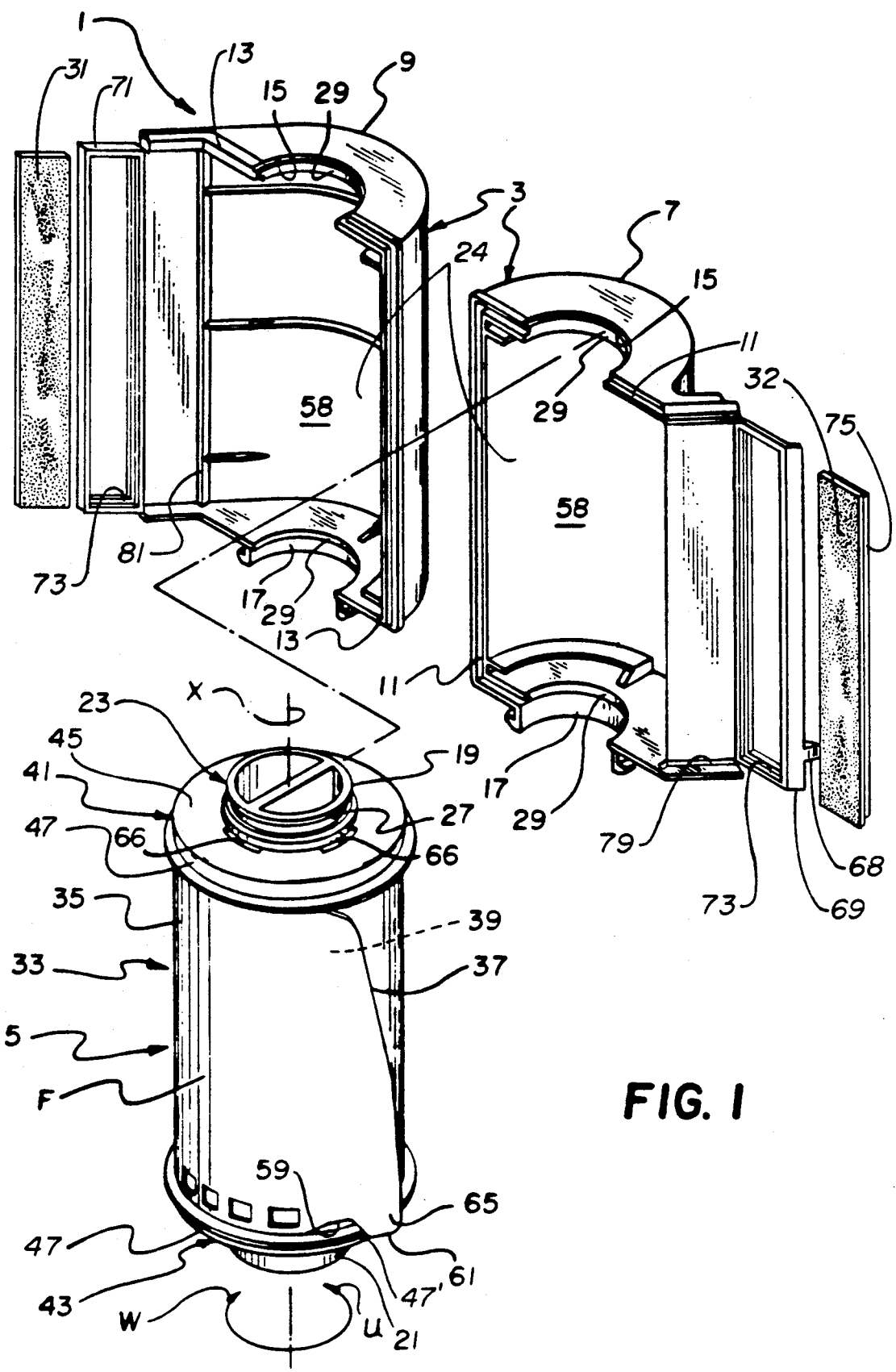
FIG. 1 is an exploded perspective view of a film cassette according to a preferred embodiment of the invention, showing respective retainers for light-trapping pads in an unfolded state.
Figure 2:
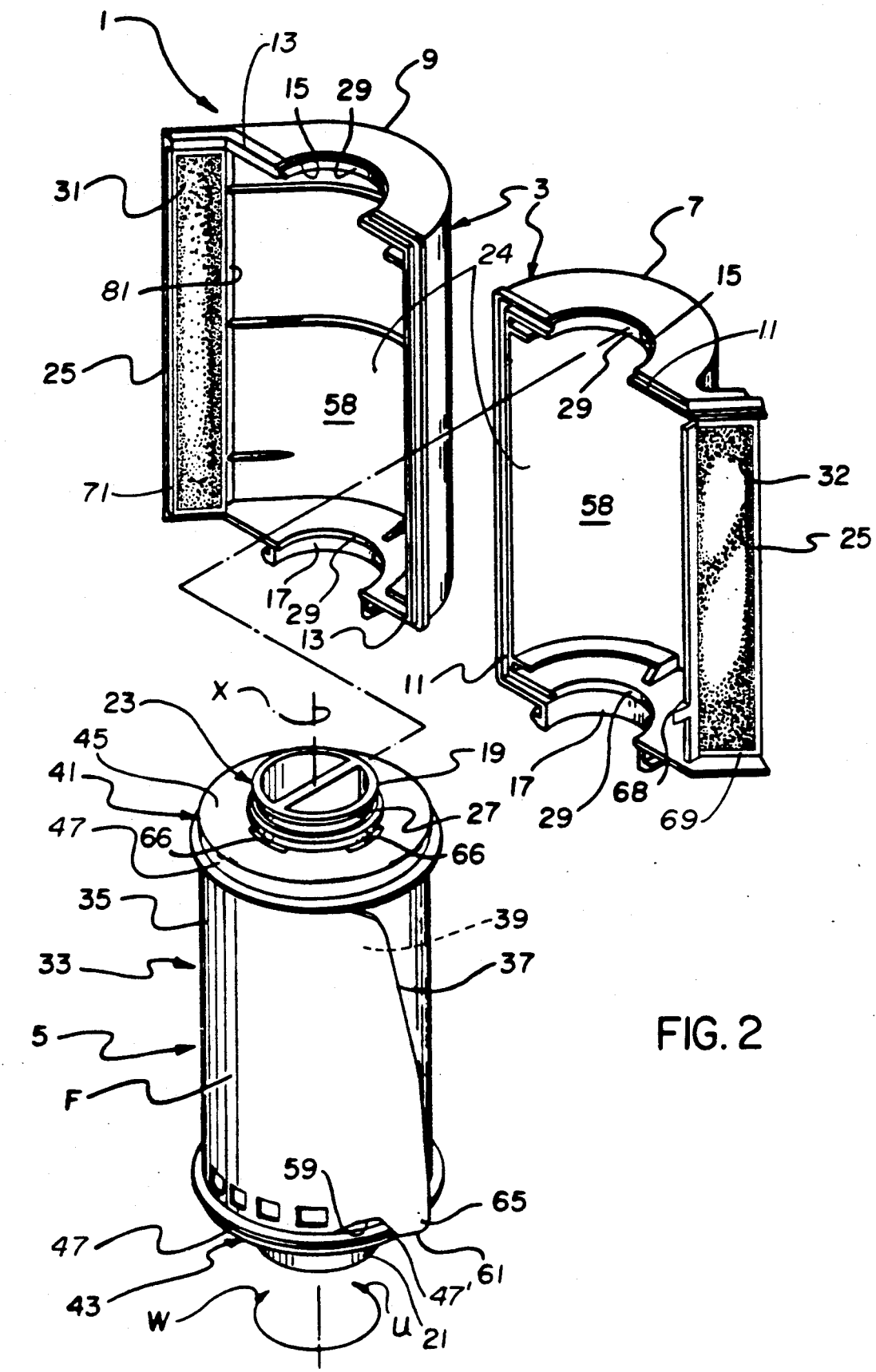
FIG. 2 is a perspective view similar to FIG. 1, showing the retainers in a folded state.

Referring now to the drawings, FIGS. 1 and 2 depict an improved 35 mm film cassette 1 comprising a light-tight cassette shell 3 and a film spool 5 which is rotatable about an axis X in film unwinding and winding directions U and W within the cassette shell. The cassette shell 3 consists of two plastic shell halves 7 and 9 which are mated along respective grooved and stepped edge portions 11 and 13. The mated halves 7 and 9 define upper and lower aligned circular openings 15 and 17 for relatively shorter and longer opposite open-end pieces 19 and 21 of a spool core or hub 23, and they define an internal film chamber 24 and a narrow relatively-straight film passageway 25 leading out of the chamber. The longer and shorter open-end pieces 19 and 21 of the spool core 23 each include an annular peripheral groove 27, only one shown, which mates with a corresponding edge portion 29 of the respective openings 15 and 17 in the cassette shell 3 to rotatably support the film spool 5 for rotation about the axis X in the film unwinding and winding directions U and W. A pair of black velvet or plush pads 31 and 32 are located in the passageway 25 to prevent ambient light from entering the film passageway.

A roll 33 of 35 mm filmstrip F is coiled about the spool core 23 to form successive film convolutions. As shown in FIG. 1, the film roll 33 includes an outermost convolution which comprises a film leader 35 having a leading or forward end 37, and it includes a next-inward convolution 39 coiled behind the outermost convolution. The inner or trailing end of an innermost convolution, not shown, of the film roll 33 is secured to the spool core 23 using known attachment means, not shown.

A pair of upper and lower identical, very thin, flexible film constraining flanges 41 and 43 are coaxially spaced along the spool core 23 as shown in FIG. 1. The pair of flanges 41 and 43 comprise respective integral disks 45 and respective integral annular lips or skirts 47 which circumferentially extend from the disks. The two disks 45 cover opposite substantially flat sides of the film roll 33 which are defined by corresponding opposite longitudinal edges of each successive convolution of the film roll, and they have respective central holes, not shown, through which the spool core 23 coaxially extends to permit rotation of the spool core relative to the flanges 41 and 43. The two annular lips 47 overlap the film leader (outermost convolution) 35 of the film roll 33 radially outwardly of the respective longitudinal edges of the leader to radially confine the leader to thus prevent it from radially expanding or clock-springing into substantial contact with an interior curved wall 58 of the cassette shell 3. A lip-receiving notch 59 is cut in the film leader (outermost convolution) 35 relatively close to its leading end 37 to receive a peripheral section 47' of one of the annular lips 47. This allows a relatively short edge-section 61 of the film leader (outermost convolution) 35 connecting the leading end 37 and the notch 59 to overlap the one lip radially outwardly to thus maintain the leading end spaced from the next-inward convolution 39 of the film roll 33. A foremost tip or tab 65 of the film leader 35, like the edge-section 61 of the leader, overlaps the one lip radially outwardly. See FIG. 1.

The pair of flanges 41 and 43 have a plurality of concentric arcuate slots 66 cut in their respective disks 45 to longitudinally extend in the film unwinding and film winding directions U and W. Engagement means in the form of respective hook-like members, not shown, integral with the spool core 23, are normally located in the concentric slots 66 for movement along the slots into engagement with the two flanges 41 and 43 responsive to rotation of the spool core relative to the flanges in the unwinding direction U and for movement along the slots out of engagement with the flanges responsive to rotation of the spool core relative to the flanges in the winding direction W.

A film stripper-guide 68 as shown in FIG. 1 projects away from the interior wall 58 of the cassette half 7 towards the film roll 33. The stripper-guide 68 is normally positioned immediately inward of the inner entrance to the film passageway 25 to be received between the leading end 37 of the film leader (outermost convolution) 35 and the next-inward convolution 39, close to the forward-most tip 65 of the leader, to pick up the leading end and guide it into the film passageway responsive to rotation of the spool core 23 in the unwinding direction U.

Once the leading end 37 of the film leader (outermost convolution) 35 is substantially advanced over the stripper-guide 68 responsive to rotation of the spool core 23 in the unwinding direction U, the respective longitudinal edges of the leader start to gently flex respective arcuate portions of the two flanges 41 and 43 away from one another, i.e. farther apart, first to allow the notch 59 to separate from the lip section 47', and then to allow successive longitudinal sections of the leader to uncoil from between the flanges and exit to the outside of the cassette shell 3.

According to the invention, a frame device 69 is hingedly connected to the shell half 7 for folding against that shell half to secure the pad 32 in place and a frame device 71 is hingedly connected to the shell half 9 for folding against that shell half to secure the pad 31 in place. See FIGS. 1 and 2. The frame devices 69 and 71 and the pads 31 and 32 have corresponding relieved edges 73 and 75 which engage to allow the frame devices to secure the pads in place when the frame devices are folded against the sell halves 7 and 9. See FIG. 1. Opposing cut-outs 79, only one shown, in the shell half 7 receive opposite ends of the frame device 69 to hold the frame device folded against the shell half. Simarly, a cross rib 81 on the shell half 9 is undercut to hold the frame device 71 folded against the shell half. The frame device 69 includes the stripper-guide 68.

In order to separate the pads 31 and 32 from the frame devices 69 and 71, one simply unfolds the frame devices as shown in FIG. 1.

OPERATION

When the spool core 23 is initially rotated in the film unwinding direction U, the pair of flanges 41 and 43 momentarily tend to remain stationary and the film roll 33, since its inner end is attached to the spool core, will expand radially or clock-spring to force the film leader (outermost convolution) 35 firmly against the two annular lips 47 of the flanges. Generally however, before the film roll 33 can be expanded radially to the extent a non-slipping relation would be created between the film leader (outermost convolution) 35 and the two annular lips 47, the hook-like members will have moved along the respective slots 66 into engagement with the two flanges 41 and 43 to fix the flanges to the spool core. Then, further rotation of the spool core 23 will similarly rotate the flanges 41 and 43. As a result, the leading end 37 of the film leader (outermost convolution) 35 will be substantially advanced over the stripper-guide 68, causing successive arcuate portions of the flanges 41 and 43 to be flexed away from one another. This first allows the notch 59 to separate from the lip section 47', and then it allows successive longitudinal sections of the film leader 35 to exit from between the flanges to the outside of the cassette shell 3.

The invention has been described with reference to a preferred embodiment. However, it will be appreciated that variations and modifications can be effected within the ordinary skill in the art without departing from the scope of the invention.

We claim:

1. A film cassette comprising a cartridge shell having respective sections that are asssembled together to define an internal film chamber and a film passageway leading out of said chamber, and light-trapping means located in said passageway to prevent ambient light from entering said chamber, is characterized in that:

at least one of said shell sections has frame means hingedly connected to said one section for folding against the one section to secure said light-trapping means in place and for unfolding to release the light-trapping means to permit it to be removed.

2. A film cassette as recited in claim 1, wherein a spool is supported for rotation in an unwinding direction in said chamber, a filmstrip is coiled about said spool to form a roll with an outermost film convolution that is a non-protruding leader, and a stripper is located on said frame means for receipt between a leading end of said leader and a next-inward film convolution of said roll to divert said leading end into said passageway responsive to rotation of said spool in the unwinding direction when the frame means is folded against said one section of said cassette shell.

3. A film cassette comprising a cartridge shell having a pair of shell sections that are asssembled together to define an internal film chamber and a film passageway leading out of said chamber, and a pair of light-trapping pads located in said passageway to prevent ambient light from entering said chamber, is characterized in that:

said shell sections have respective frame means hingedly connected to the individual sections for folding against the individual sections to secure said light-trapping pads in place and for unfolding to release the light-trapping pads to permit them to be removed.

4. An unassembled film cassette comprising shell sections adapted to be asssembled together to define an internal film chamber and a film passageway leading out of said chamber, and light-trapping means adapted to be located in said passageway to prevent ambient light from entering said chamber, is characterized in that:

at least one of said shell sections has frame means hingedly connected to said one section for folding against the one section to secure said light-trapping means in place.

* * * * *